Sept. 5, 1939.   R. F. PEO   2,171,762
DRY ICE AIR CONDITIONER
Filed June 12, 1937   2 Sheets-Sheet 1
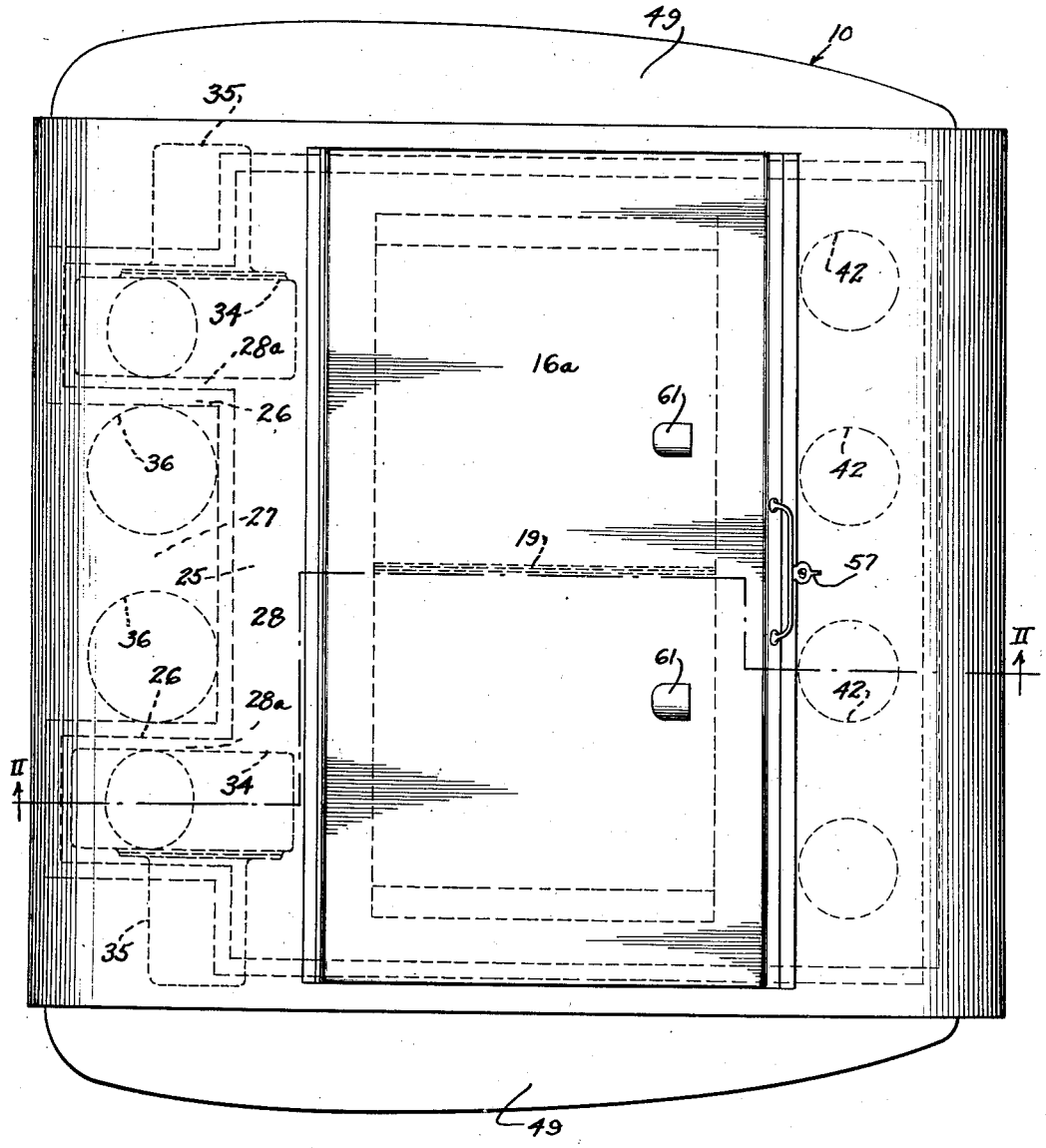
Inventor
RALPH F. PEO.
by Charles A. Hill Attys.

Sept. 5, 1939.  R. F. PEO  2,171,762
DRY ICE AIR CONDITIONER
Filed June 12, 1937   2 Sheets-Sheet 2
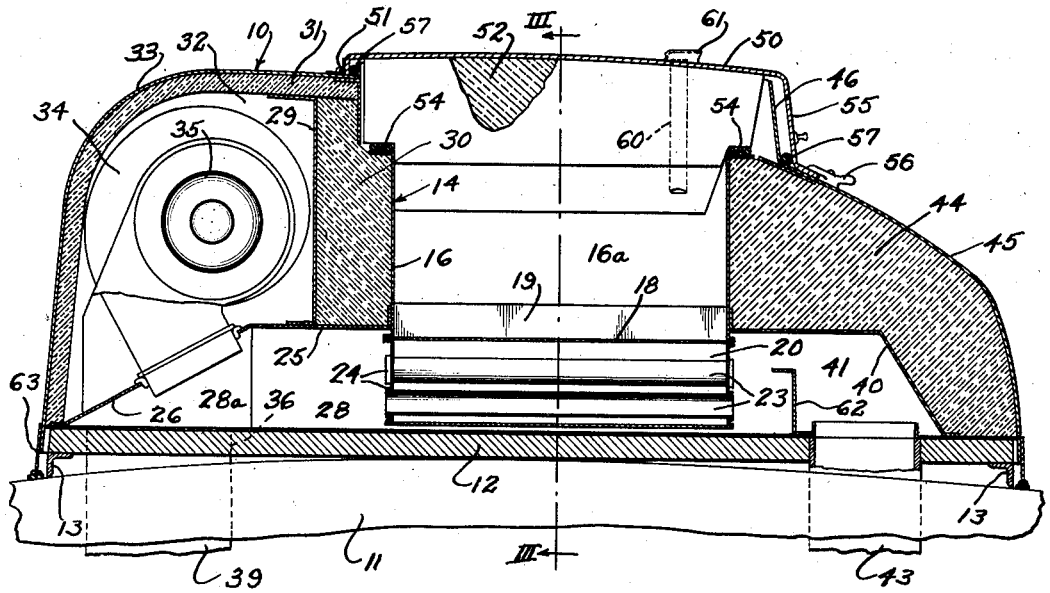
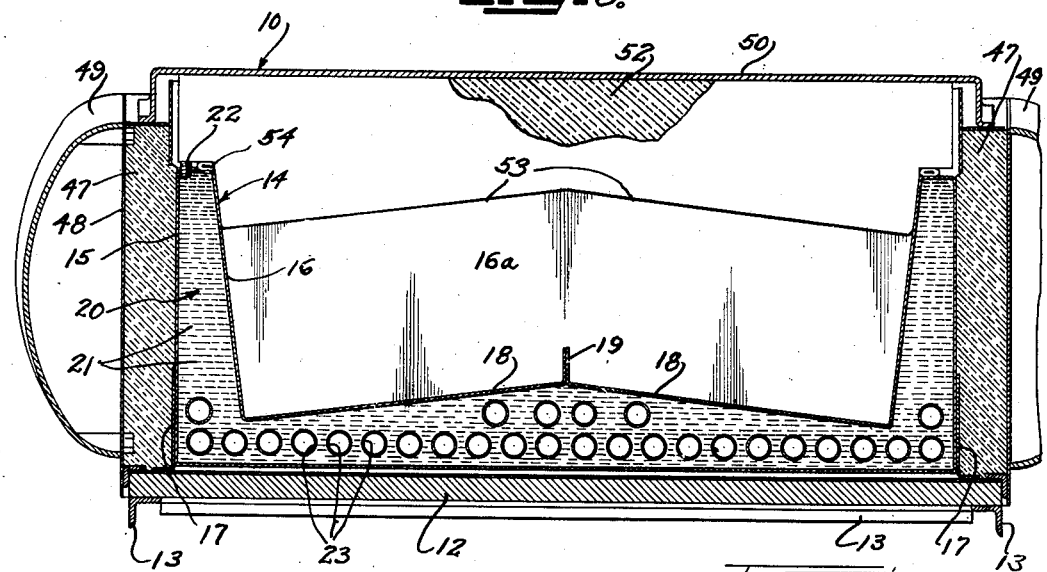
Inventor
RALPH F. PEO.
by Charles H. Hill Attys.

Patented Sept. 5, 1939

2,171,762

UNITED STATES PATENT OFFICE 2,171,762

DRY ICE AIR CONDITIONER

Ralph F. Peo, Buffalo, N. Y., assignor to Houde Engineering Corporation, Buffalo, N. Y., a corporation of New York Application June 12, 1937, Serial No. 147,807

10 Claims. (Cl. 62—134)

This invention relates to cooling units for automotive vehicles adapted to be mounted on top of the roof of such vehicles for receiving air therefrom to cool the air therein and for propelling the cooled air back to the vehicle.

More specifically this invention relates to roof mounted air conditioners having ice chests surrounded with non-freezing liquid and having air passage tubes extending through the liquid for cooling air passing through the tubes.

The invention will be hereinafter specifically described in connection with closed passenger vehicles but it should be understood that the units of this invention are adapted to be mounted on the roof of various types of vehicles having a storage space, a passenger compartment or the like area to be cooled.

The units of this invention comprise streamlined casings built up on a supporting base. Blowers are housed in the casings for drawing air therein and for propelling the air received through the casing back to the vehicle. The casings also include ice chests for receiving dry ice or other cooling agents therein. The ice chests are surrounded with a liquid tight chamber adapted to receive a non-freezing liquid such as alcohol therein. A plurality of tubes pass through the chamber and the blowers in the casing direct the air therein through these tubes whereupon the air is cooled by contact with the tubes. The tubes of course are cooled by the surrounding liquid and the liquid is cooled by dry ice or other cooling agent. Highly efficient heat transfer is obtained between the cooling agent and the air through the non-freezing liquid.

It is then an object of this invention to provide an air conditioning unit adapted to be mounted on top of the roof of an automotive vehicle and containing a non-freezing liquid to increase the heat transfer between the air passed through the unit and the cooling agent.

A further object of this invention is to provide improved heat transfer means in roof mounted air conditioners.

Another object of this invention is to provide a dry ice air conditioner for automotive vehicles including a dry ice chest surrounded by a heat transfer liquid.

A further object of this invention is to provide in a roof mounted air conditioner, a chest for receiving a cooling agent and a compartment for a heat transfer liquid surrounding the chest.

Other and further objects of this invention will become apparent to those skilled in the art from the following detailed description of the annexed sheets of drawings which disclose a preferred embodiment of the invention.

On the drawings:

Figure 1 is a top plan view of an air conditioning unit according to this invention.

Figure 2 is a cross-sectional view, with parts in elevation, taken substantially along the line II—II of Figure 1.

Figure 3 is a cross-sectional view taken substantially along the line III—III of Figure 2.

As shown on the drawings:

In Figures 1 to 3 inclusive, the reference numeral 10 designates generally an air conditioning unit according to this invention. As best shown in Figure 2, the unit 10 is mounted on top of the roof 11 of an automotive vehicle.

The unit 10 is built up on a baseboard 12 and supporting brackets 13 may be disposed around the periphery of the baseboard 12 on the under face thereof to provide reinforcing means for securing the unit onto the roof 11.

As best shown in Figure 3, a double walled tank or chest 14 having outer walls 15 and inner walls 16, is mounted on the base 12 by means of clamps or brackets 17 extending parallel with the side of the base in spaced relation therefrom. The chest 14 is disposed intermediate the ends of the base 12.

The inner walls 16 of the chest 14 define an open top dry ice receptacle 16a having a bottom 18 inclined from the center thereof and provided with an upturned ridge or flange 19 at the center for a purpose to be hereinafter described.

The outer walls 15 surrounding the walls 16 define a compartment 20 surrounding the receptacle 16a. The compartment 20 receives a non-freezing liquid 21 such as alcohol therein. The liquid 21 can be introduced by removing a plug 22 threaded through a wall of the compartment 20.

A plurality of tubes 23 extend through the compartment 20 and are secured at their ends in the end walls of the compartment as shown at 24 in Figure 2.

As shown in Figure 2, a wall member 25 is secured to the front end wall of the chest member 14 near the bottom thereof and extends forwardly toward the front end of the base 12. As best shown in Figures 1 and 2, the wall member 25 has sloping portions 26 near the sides of the base or wall. The sloping portions 26 define therebetween a space 27 for a purpose to be hereinafter described.

The wall member 25, together with its sloping portions 26, as best shown in Figure 2, defines a compartment 28 communicating with the insides of the tubes 23 and with the compartments 28a beneath the sloping wall portions 26.

As best shown in Figure 2, a wall member 29 is disposed on top of the member 25 and extends upwardly therefrom to above the top of the chest 14. Insulation 30 is disposed between the wall member 29 and the chest 14.

An insulating board 31 extends over the wall member 29 and down to the front end of the base 12 thereby defining a chamber 32. The board 31 may be covered with a metal casing 33 to impart rigidity to the structure.

Blowers 34 are mounted in the compartment 32 on top of the sloping wall portions 26 and have their discharge ports communicating with the compartments 28a. Motors 35 are secured directly to the blowers 34 for driving the same.

The motors 35 may be energized by current supplied from the storage battery or generator of the automotive vehicle.

The motors 35 and the blowers 34 are the only moving parts in the air conditioners of this invention.

As best shown in Figure 1, holes 36 are cut in the base 12 in the space 27 between the wall members 26. As shown in Figure 2, flexible tubes such as 39 extend through the roof 11 of the vehicle and connect the interior of the vehicle with the compartment 32 in the air conditioning unit 10. Air is then circulated from the vehicle into the compartment 32 and blown by the blowers 34 into the compartment 28 from which the air passes through the tubes 23.

The rear wall of the chest or tank 14 receives a wall member 40 thereon in spaced relation from the bottom thereof. The wall member 40 defines a chamber 41 for receiving air from the tubes 23.

As best shown in Figure 1, the rear end of the baseboard is provided with a plurality of holes 42 therethrough at the bottom of the compartment 41.

The holes 42 receives flexible tubes 43 (Figure 2) therein and the tubes 43 extend through the roof 11 of the vehicle for conveying air back to the vehicle.

As best shown in Figure 2, the back wall of the chest 14 and the wall 40 are surrounded with insulation 44 and the insulation 44 is covered with a sheet of metal 45 secured to the rear end of the baseboard 12 and having the central portion of the other end turned upward to define a flange 46.

The sides of the unit have insulation 47 packed therealong as shown in Figure 3 and are covered with sheet metal 48. Streamlined reinforced members 49 as shown in Figures 1 and 3 are secured to the sides of the unit. These members 49 can be light weight castings or stampings.

The open top of the chest or tank 14 is closed by a door 50 pivoted on top of the casing as at 51 (Figure 2). The door 50 carries a block of insulation material 52 on the under side thereof. The insulation block 52 has sloping bottom edges 53 conforming with the slope of the bottom 18 of the receptacle 16a.

Gaskets 54 are disposed on top of the chest member 14 and are compressed by the block 52 when the door 50 is closed.

The door 50 has a rear portion 55 adapted to be disposed over the flange 46 of the sheet metal member 45 as shown in Figure 2 and clamped by means of a locking device 56 to secure the door in closed position. Additional seals or gaskets 57 may be disposed between the portion 55 of the cover and the flange 56 as well as at the front end of the door as shown in Figure 2.

Vents such as 60 extend through the door 50 for permitting the escape of gases from the receptacle 17. The vents 60 are covered with rearwardly opening bonnets 61.

Cakes of dry ice or other cooling agents are disposed in the receptacle and rest on the sloping bottom wall 18 thereof. As the cakes decrease in size, they continually move toward the side walls 16 of the receptacle and thus remain in contact with a wall of the receptacle that contacts the heat transfer liquid 21.

From the above description, it should be understood that this invention provides an air conditioner adapted to be mounted on the roof of an automotive vehicle comprising a single unit having an ice chest therein adapted to be filled with ice from the top thereof and also having a compartment for a heat transfer liquid surrounding the ice chest. Blowers are disposed in the unit for drawing air through the roof of the vehicle into a compartment in the unit and for blowing the air from this compartment through tubes extending through the heat transfer liquid. The air is thus cooled by passing through the tubes and is directed back into the vehicle through additional openings in the roof thereof.

Moisture condensed out of the air by the cooling thereof is prevented from entering the vehicle by means of a baffle plate 62 (Figure 2).

The air conditioner unit can be made in standardized sizes and a shroud skirt such as 63 (Figure 2) is provided for wrapping around the base of the unit to conform with the particular roof contour of the vehicle. Thus the unit can be streamlined to a standardized form and size and made to conform to any roof contour by means of shroud skirts cut to conform with the roof contour.

The air conditioning units of this invention can be bodily removed from the vehicle and replaced with other units in very short time thereby permitting repair of the unit without taking the vehicle out of service for an appreciable time.

I am aware than many changes may be made and numerous details of construction may be varied through a wide range without departing from the principles of this invention, and I, therefore, do not purpose limiting the patent granted hereon otherwise than necessitated by the prior art.

I claim as my invention:

1. An air conditioner for automotive vehicles comprising a casing, an ice chest in said casing, means surrounding said ice chest defining a compartment around the chest for receiving a heat transfer liquid therein, tubes extending through said compartment, a blower in said casing for receiving air to blow the air through said tubes to be cooled by contact therewith and means for directing the cooled air into the automotive vehicle.

2. An air conditioner for automotive vehicles comprising a streamlined casing adapted to be mounted on the roof of an automobile, a compartment in said casing for receiving air from the interior of the automobile, an ice chest in said casing, a compartment surrounding said ice chest for receiving a heat transfer liquid therein, a plurality of tubes extending through said compartment surrounded by said liquid, blowers for blowing air from said compartment through said tubes and means for directing the air after passage through said tubes back to the automotive vehicle.

3. An air conditioner for automotive vehicles comprising a flat base plate, said base plate having holes through the front and rear portions thereof for communicating with the interior of an automotive vehicle, means defining a compartment on the front end of said base plate for receiving air through the holes therein, a blower in said compartment, means defining a compartment at the rear end of said base plate above the holes therethrough, an ice chest intermediate said compartments, a tank for heat transfer liquid surrounding said ice chest, a plurality of tubes extending through said tank in intimate thermal contact with the liquid therein for joining said compartments and means for driving said blower whereby air is drawn into the compartment at the front end of the base plate, blown through the tubes to the rear compartment and discharged out of the holes at the rear of the base plate.

4. An air conditioning unit comprising a housing adapted to be mounted on the roof of an automotive vehicle and having front and rear compartments in communication with the interior of the vehicle, a double walled tank in said casing between said compartments, a heat transfer liquid between the walls of said tank, and a plurality of tubes extending through the compartment defined by the inner and outer walls of the tank for joining the front and rear compartments in the casing.

5. A dry ice air conditioner adapted to be mounted on the roof of an automotive vehicle comprising a streamlined casing having front and rear compartments therein, a tank disposed between said compartments having inner and outer walls defining therebetween a fluid tight chamber, said inner wall of said tank defining an ice chest, a plurality of tubes extending through said chamber joining the compartments in the casing, and a blower in one of said compartments for blowing air through said tubes to be cooled by thermal contact therewith.

6. An air conditioner for automotive vehicles comprising a flat base plate, said base plate having holes through the front and rear portions thereof for communicating with the interior of an automotive vehicle, means defining a streamlined casing above said base plate, means defining a compartment on the front end of said base plate within said casing for receiving air through the holes therein, a blower in said compartment, means defining a compartment at the rear end of said base plate above the holes therethrough and within said casing, a double walled tank in said casing between said compartments, a heat transfer liquid between the walls of said tank, a plurality of tubes extending through the compartment defined by the inner and outer walls of the tank for joining the front and rear compartments in the casing, and means for driving said blower whereby air is drawn into the compartment at the front end of the base plate, blown through the tubes to the rear compartment and discharged out of the holes at the rear of the base plate.

7. An air conditioner for automotive vehicles comprising a base plate, said base plate having holes through the front and rear portions thereof for communicating with the interior of said automotive vehicle, means defining a streamlined casing above said base plate, an ice chest in said casing, means surrounding said ice chest defining a compartment around the chest for receiving a heat transfer liquid therein, tubes extending through said compartment, a blower in said casing for receiving air from the automotive vehicle to blow the air through said tubes to be cooled by contact therewith and means for returning the cooled air to the automotive vehicle.

8. An air conditioner for automotive vehicles comprising a base plate, said base plate having holes through the front and rear portions thereof for communicating with the interior of said automotive vehicle, means defining a streamlined casing above said base plate, a compartment in said casing for receiving air from the interior of said automotive vehicle, an ice chest in said casing, a compartment surrounding said ice chest for receiving a heat transfer liquid therein, a plurality of tubes extending through said compartment surrounded by said liquid, blowers for blowing air from said compartment through said tubes and means for directing the air after passage through said tubes back to said automotive vehicle.

9. An air conditioning unit adapted to be mounted on the roof of an automotive vehicle comprising a flat base plate, said base plate having holes through the front and rear portions thereof for communicating with the interior of said automotive vehicle, means defining a streamlined casing above said base plate, said casing having front and rear compartments communicating through said holes in said base plate with the interior of said vehicle, a double walled tank in said casing between said compartments, a heat transfer liquid between the walls of said tank, and a plurality of tubes extending through the compartment defined by the inner and outer walls of said tank for joining the front and rear compartments in the casing.

10. A dry ice air conditioner adapted to be mounted on the roof of an automotive vehicle comprising a flat base plate, said base plate having holes through the front and rear portions thereof for communicating with the interior of said automotive vehicle, a streamlined casing above said base plate, said casing having front and rear compartments therein, a tank disposed between said compartments having inner and outer walls defining therebetween a fluid tight chamber, said inner wall of said tank defining an ice chest, a plurality of tubes extending through said chamber joining the compartments in the casing, and a blower in one of said compartments for blowing air through said tubes to be cooled by thermal contact therewith.

RALPH F. PEO.